May 5, 1970 W. W. BULGRIN 3,509,755
METHOD AND APPARATUS FOR PRODUCING VEHICLE RIMS
Filed Sept. 13, 1967 4 Sheets-Sheet 2
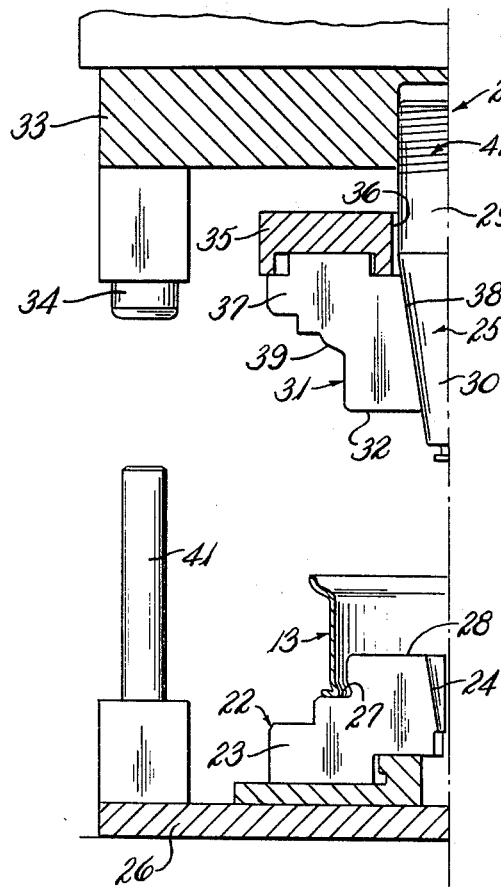
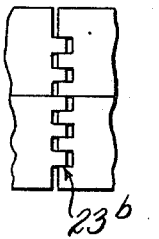
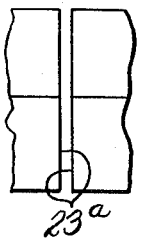
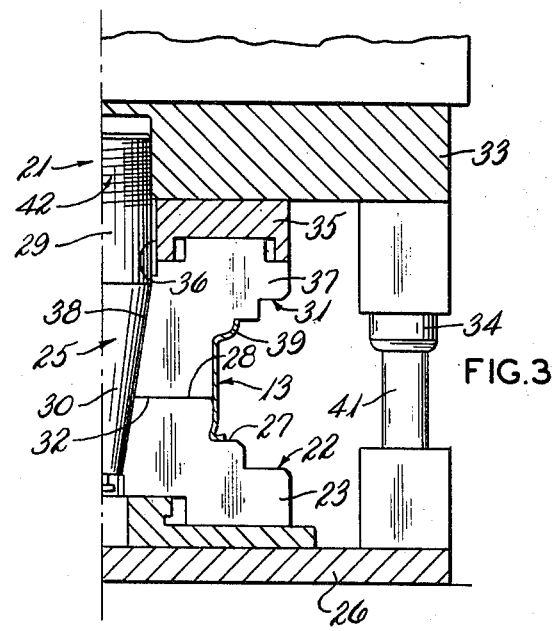
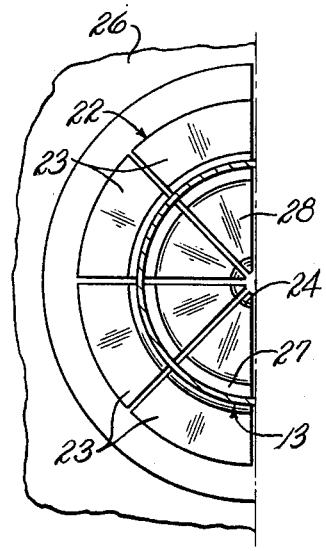
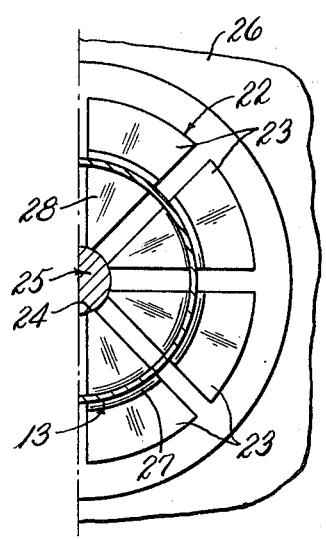

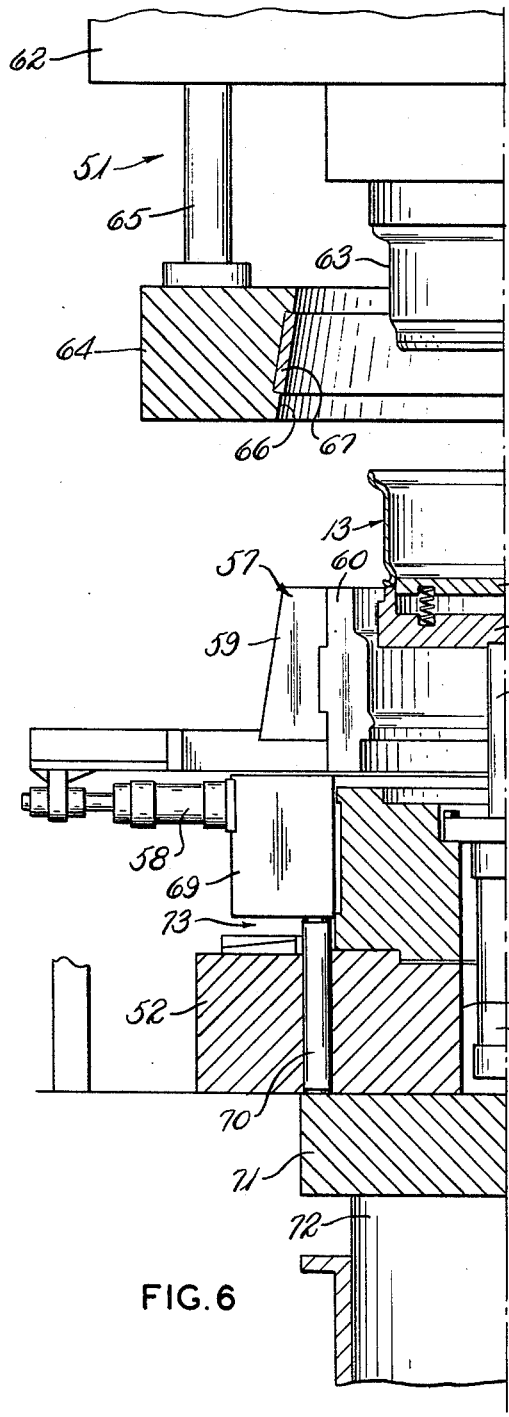
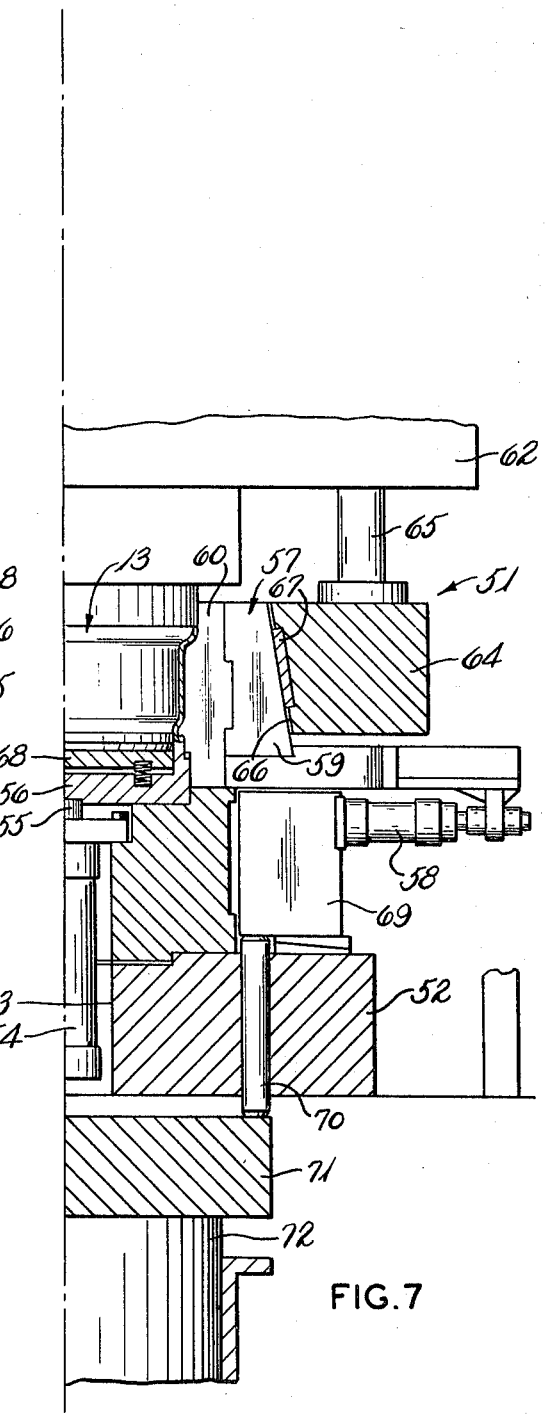
FIG. 6
FIG. 7

May 5, 1970  W. W. BULGRIN  3,509,755
METHOD AND APPARATUS FOR PRODUCING VEHICLE RIMS
Filed Sept. 13, 1967  4 Sheets-Sheet 4

United States Patent Office 3,509,755
Patented May 5, 1970

3,509,755
METHOD AND APPARATUS FOR PRODUCING VEHICLE RIMS
Walter William Bulgrin, Wadsworth, Ohio, assignor to The Firestone Tire & Rubber Company, Akron, Ohio, a corporation of Ohio
Filed Sept. 13, 1967, Ser. No. 667,485
Int. Cl. B21d 22/06
U.S. Cl. 72—355                    7 Claims

ABSTRACT OF THE DISCLOSURE

Forming a vehicle rim to precise tolerances by first forming a contoured strip into a closed hoop; then radially expanding the hoop in a press having radially outwardly moving die sections; finally precision-finishing by applying pressure to all parts of the rim in a press having radially inwardly moving die sections which lock against the outer rim surface while an axially moving punch exerts radial outward, as well as axial, pressure.

BACKGROUND OF THE INVENTION

This invention relates to the art of manufacturing vehicle wheel rims and more particularly to method and apparatus for the cold finish forming of pre-formed, circled and welded metal blanks in mass producing vehicle tire rim products having improved quality, run out, and size tolerances, for better performance in use on the vehicle.

Many different methods have heretofore been employed in the manufacture of metal rims for vehicle tires. One of the most commonly employed of these methods has included pre-forming a metal band of appropriate length by rolling a steel mill section bar to an approximate predetermined profile or cross-sectional shape, rough-circling the pre-formed band and joining the ends of the band by welding to form a hoop. The hoop is then expanded in an expansion press operation to a substantially finished contour and diameter and subjected to an additional rolling operation through contoured rolls to obtain more precise contour and desired dimensions for the rim. Subsequently, the hoop is sized to the proper diameter through a series of expand and shrink operations to complete the tire rim.

Such a method, however, has not proved entirely satisfactory in that rim products fabricated by this method generally possess undesirably large variations in contour, thickness and concentricity. Moreover, such products do not have the high degree of hardness and tensile strength desired to obtain a rim product of long-lasting quality. Further, the variations in contour, thickness and concentricity of the rims produced by this method impair the riding qualities when employed on a vehicle. Such a method also requires an unduly large number of steps or operations to complete each rim product, thus increasing to a significant extent the cost of manufacture of the rim products.

To overcome the disadvantages of the prior art, it is an object of the present invention to provide an improved method and apparatus for manufacturing a wheel rim whereby a rim blank of substantially finished contour and diameter is subjected to a single die-forming operation which cold forms the blank to a precision finished product of predetermined contour and diameter.

Another object of the invention is to provide such a method and apparatus for manufacturing wheel rims which produces rims having consistent contour and concentricity characteristics as well as possessing greater strength and hardness than rims made by prior conventional methods.

A further object of the invention is to provide an improved method and apparatus for manufacturing wheel rims which significantly reduces the number of manufacturing operations necessary to produce a finished product, thus allowing for a more compact and economical production line.

A still further object of the invention is to provide such an improved method and apparatus for manufacturing wheel rims, wherein the rim is cold formed to precision finished predetermined contour and diameter characteristics in a single operation through the simultaneous application of pressure to all parts of the rim blank.

Another object of the invention is to provide an improved method and apparatus for manufacturing wheel rims which produces rims having improved run-out qualities and size tolerances for improved performance in use in the vehicle equipment industry.

Still another object of the invention is to provide an improved apparatus for manufacturing wheel rims employing split expanding forming dies.

Still another object of the invention is to provide an improved apparatus for manufacturing wheel rims employing a plurality of split straight sided segmented expanding forming dies.

Still another object of the invention is to provide an improved apparatus for manufacturing wheel rims employing a plurality of split interlocking expanding forming dies.

A further object of the invention is to provide an improved apparatus for manufacturing wheel rims employing a press die capable of applying substantial pressure simultaneously to all parts of a wheel rim to produce a rim having precision finished predetermined contour and diameter characteristics.

A still further object of the invention is to provide such an improved apparatus employing dies having interchangeable inserts and spacers to accommodate wheel rim blanks of different contours and dimensions.

SUMMARY OF THE INVENTION

In general, the invention relates to a method of manufacturing a wheel rim comprising forming a hoop from a meal band, uniformly radially expanding and laterally flattening said hoop to form a rim blank of substantially finished dimensions, and subsequently cold die-forming said blank to precision finished dimensions in a single operation by the application of pressure to all parts of said blank.

The invention further relates to an apparatus for manufacturing a wheel rim generally comprising means for supporting a wheel rim blank in a work position, a plurality of radially movable die members normally positioned radially outwardly of said work position, means for moving said die members radially inwardly into working contact with the exterior of the blank in said work position, a die locking ring and a punch normally positioned above said work position, and means for moving said ring and thereafter said punch downwardly into said work position in coordination with the radially inward movement of said die members whereby said ring encircles and contacts the outer faces of said die members to lock them in position and maintain them in contact with the outside of the blank, and said punch contacts the interior of the blank to apply axial and radial pressure to all parts of said blank to cold form said blank to a precision finished predetermined dimension in a single operation.

The invention also contemplates apparatus for radially expanding and laterally flattening a cylindrical metal blank generally comprising a lower die having a plurality of radially outwardly movable segments, said segments normally being in a substantially closed inward position to form a support for the blank, an upper die normally positioned directly above said lower die and having a plurality of radially outwardly movable segments, said segments normally being in a substantially closed inward position, a punch normally positioned above said lower die centrally of said segments of said upper die, said punch being free for relative movement with respect to said upper die, and means for simultaneously moving said upper die and said punch axially downwardly whereby said upper die contacts said lower die to confine the edges of the blank between the upper and lower die ledges and said punch moves downwardly through the center of said upper and lower dies to force said segments of said dies to expand radially outwardly, and uniformly expand and flatten the edges of the blank to a predetermined dimension.

BRIEF DESCRIPTION OF THE DRAWINGS

The invention having been broadly described, a specific method and embodiment thereof and apparatus for carrying out such method will now be set forth in detail with reference to the accompanying drawings, in which FIG. 1 embodying views *a* through *i* represents a schematic diagram of the sequence of steps or operations involved in the method of manufacturing a wheel rim of the present invention;

FIG. 2 is a half vertical sectional view with parts in elevation showing apparatus for uniformly expanding and flattening a cylindrical metal blank according to the present invention with the dies shown spaced apart in a non-work position;

FIG. 3 is a view similar to FIG. 2 of the same apparatus as shown in FIG. 2 but showing the dies in a closed work position;

FIG. 4 is a plan view of the lower sectional die of the apparatus of FIG. 2 showing a wheel rim blank in section and the segments of the die in their substantially closed inward position;

FIG. 5 is a plan view of the lower sectional die of the apparatus of FIG. 3 showing a wheel rim blank in section with the segments of the lower die radially expanded to their work position;

FIG. 6 is a half vertical sectional view of apparatus for precision finishing a rim blank to a predetermined contour and diameter according to the present invention with the dies of the apparatus being shown in a non-work position;

FIG. 7 is a view similar to FIG. 6 of the same apparatus as shown in FIG. 6 but showing the dies in a closed work position;

FIG. 11 is a fragmentary side elevation showing die segments of the press of FIGS. 2 through 5 in which the segments are straight sided; and, FIG. 12 is a view similar to FIG. 11 showing a modification in which the die segments are provided with interlocking sides.

DESCRIPTION OF THE PREFERRED EMBODIMENTS

Figure 1:
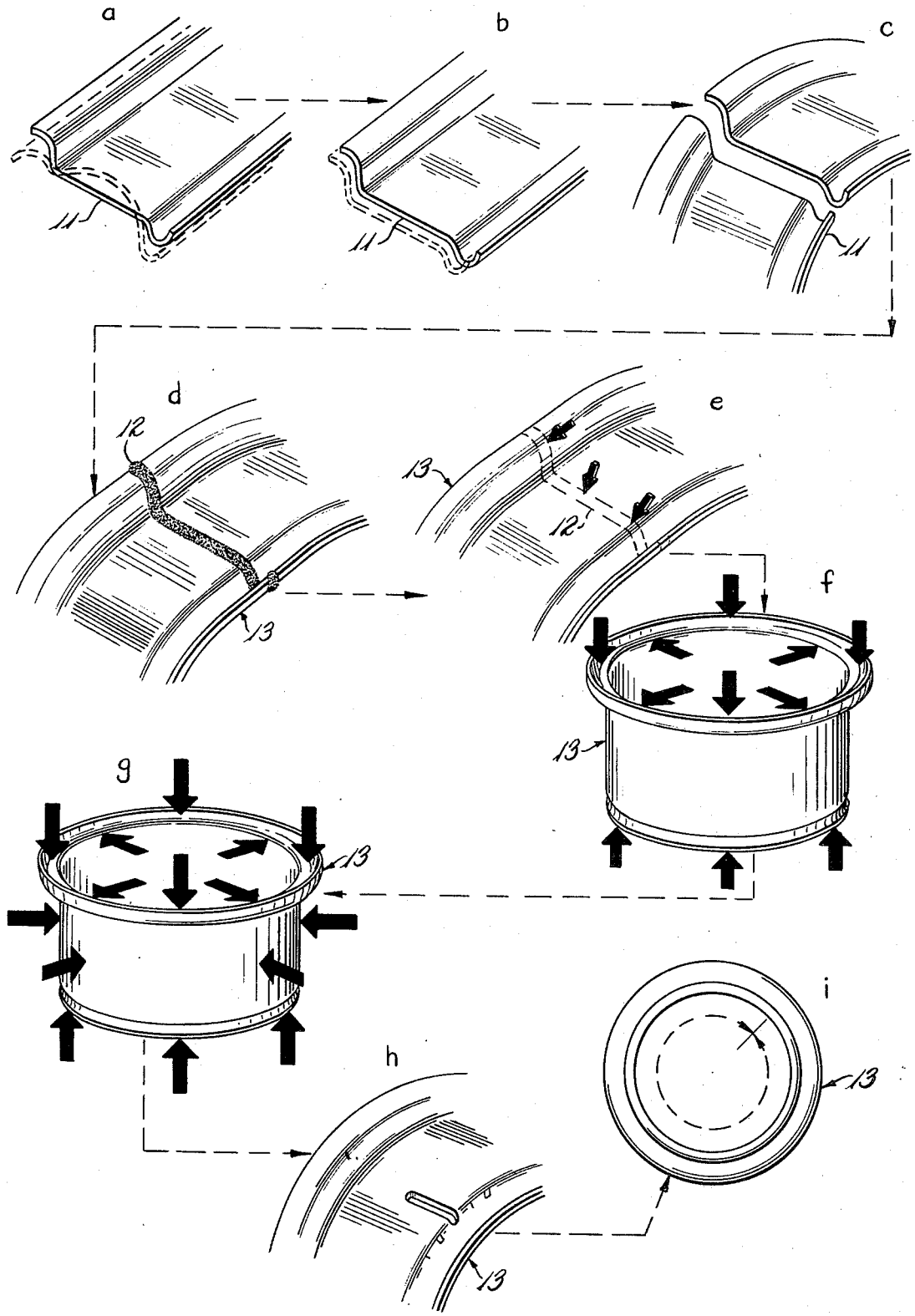

Illustrated in FIG. 1 of the drawings is a schematic diagram showing the sequence of steps involved in the manufacture of a wheel rim according to the present invention. Initially a strip of metal, which may be a steel mill section bar, is preformed to an approximate predetermined cross-sectional contour and length as shown in views *a* and *b* of FIG. 1. Preferably this pre-forming is accomplished by hot rolling a steel mill section bar to form a metal strip 11 to the desired approximate predetermined contour. The metal strip 11 is then rough-circled as shown in view *c*, whereafter the ends of the strip are joined by any suitable means such as welding 12, as shown in view *d* of FIG. 1, to form a band or hoop 13. The excess welding material is subsequently removed by suitable means such as burr-shearing, and subsequently the joint may be coined as shown in view *e* of FIG. 1 to provide a smooth, continuous joint.

After the metal strip has been formed into a hoop, the hoop is radially expanded and laterally flattened to form a rim blank of substantially finished contour and diameter as shown in view *f* of FIG. 1. The radial expansion may be effected by any suitable apparatus. One form of apparatus for such radial expansion is shown in FIGS. 2 through 5 and 8, as will be explained more fully hereinafter. In the step illustrated in view *f*, it is to be noted that the rim blank is formed from an approximately predetermined contour, diameter and width to a substantially finished contour and diameter by apparatus which radially expands and laterally flattens the hoop.

The most significant step of the method of the present invention is illustrated in view *g* of FIG. 1, wherein the substantially finished blank previously described is precision-finished to predetermined contour, thickness and diameter characteristics in a single operation by the application of pressure to all parts of the blank as shown by the arrows in view *g*. The illustrated precision-finishing operation may be effected by a suitable die-forming apparatus such as that shown in FIGS. 6 and 7, and FIGS. 9 and 10, as will be explained more fully hereinafter. It is to be noted that the precision-finishing operation contemplates the application of both radial and axial pressure as illustrated by the arrows to all parts of the rim blank, including the exterior and the interior thereof.

Briefly stated, the precision-finishing operation shown in view *g* of FIG. 1 may be accomplished through the use of a punch which uniformly expands the rim blank into a solid outer contoured mold having the desired predetermined contour. This rim pressure fabrication process produces rim products with more consistent contour, thickness and concentricity characteristics, as well as improved fatigue life for the rim, and increased hardness and tensile strength. The resulting closer lateral and radial run-out tolerances contribute to improved riding qualities when the rim is used on a vehicle.

It is further to be noted that the application of substantial pressure to all parts of the rim blank in the precision-finishing operation burnishes the surfaces thereof while cold working the rim metal material to form a finished rim product having the desired predetermined contours and dimensions. The single step precision-finishing operation is particularly significant in that it substantially reduces the number of manufacturing operations formerly necessary to produce a wheel rim and consequently permits a more compact and economical production line. This, of course, results in greater efficiency and economy in production.

After the rim blank has been precision-finished, as shown in view *g* of FIG. 1, it is then subjected to a piercing and lancing operation as illustrated in view *h*, and subsequently inspected for final use as shown in view *i*, of FIG. 1.

FIGS. 2 through 5 show apparatus for radially expanding and laterally flattening a cylindrical metal blank such as a wheel rim 13 in the manner contemplated by the step shown in view *f* of FIG. 1. The press of FIGS. 2 through 5, generally indicated by the numeral 21, comprises a lower die 22 of desired outer contour for the rim to be produced, such die having a plurality of radially movable segments 23. The segments 23 are provided with straight sides 23*a* as shown in FIG. 11, or interlocking portions 23*b* as shown in FIG. 12. Die 22 is mounted on a suitable base member 26 for the segments 23 to be movable radially on such member. The die segments 23 are normally in a substantially closed inward position, forming a support for the rim blank 13, as shown in FIGS. 2 and 4. The segments 23 may normally be biased to a closed inward position by any suitable biasing means such as connecting springs (not shown). The segments 23 collectively define an opening 24 at their inner edges adapted to receive a punch 25. The opening 24 is tapered outwardly from the bottom of die 22 to the top thereof, as shown in FIG. 2, and the die is provided on its outer contour with a ledge 27 for supporting the bottom of the rim blank 13. Further, die 22 has a flat top 28 to engage and support the bottom 32 of an upper die 31 when the die 31 is moved down into work position.

The upper portion of press 21 includes a vertically movable plate 33 having a plurality of hollow sleeve members 34 mounted adjacent its outer edges. Any suitable means such as a fluid pressure operated device may be employed to positively move plate 33 vertically upwardly or downwardly. A punch 25 is fixed at the center of plate 33 to be disposed directly above opening 24 formed by the segments 23 of lower die 22. The punch 25 is comprised of a generally cylindrical upper section 29 and a downwardly and inwardly tapering lower section 30, as shown in FIG. 2.

Upper die member 31 is suspended from a circular plate 35 which in turn is vertically movably connected to press plate 33 by any suitable means (not shown). Plate 35 is provided with a cylindrical opening 36 at the center thereof to receive punch 25. Plate 35 and upper die 31 are suspended to be vertically movable relative to plate 33 so that the plate 35 and die 31 may move relative to the punch 25 and plate 33 as the upper assembly moves downward to the point where the upper die 31 contacts the lower die 22.

Upper die 31 is positioned directly above the lower die 22 and is comprised of a plurality of radially movable segments 37. The upper die segments 37 may be provided with straight or interlocking sides, similar to the lower die segments 23, as shown in FIGS. 11 and 12, respectively. The segments 37 are normally biased into a substantially closed inward position, as shown in FIG. 2, by any suitable biasing means (not shown). Plate 35 is suitably provided with elongated slots on its lower surface to mount the segments 37 to permit them to be radially movable with respect to plate 35.

The segments 37 of upper die 31 by their inner edges define a central tapered opening 38 to receive punch 25. Opening 38 is tapered outwardly from the bottom of die 31 to the top thereof as shown in FIG. 2. The outer contour of die 31 is provided with a ledge 39 to contact the top of rim 13 when die 31 is moved downwardly into work position.

The bottom plate 26 of press 21 is provided, adjacent its outer edges, with a plurality of upwardly extending posts 41, as shown in FIG. 2, which are slidably received within the sleeves 34 depending from die plate 33 as the upper part of the die is moved downwardly. Dies 22 and 31 are preferably readily removable so that they may be easily changed to accommodate forming rim blanks of different contour.

In operation of the press 21, the rim hoop 13 is positioned on lower die 22. Upper plate 33, punch 25, die 31 and sleeves 34 are then positively moved downwardly to initiate the press forming operation. As the entire upper portion of the press moves downwardly, the bottom face 32 of upper die 31 comes in contact with upper face 28 of lower die 22 and ledge 39 of upper die 31 contacts the top of rim 13. As upper plate 33 continues its downward movement, punch 25 slides into opening 24 of lower die 22 causing the segments 23 to expand radially, by a wedging action. Further, as punch 25 continues its downward movement, it similarly acts to force the segments 37 of upper die 31 radially outwardly against rim 13. Upper plate 33 continues its downward movement until it contacts the upper face of plate 35, whereupon a substantial radial and axially downward pressure is exerted on rim blank 13 as shown in FIG. 3. It is to be noted that as plate 33 moves downward the posts 41 are slidably received within sleeves 34 to guide and maintain in position the upper part of the press 21 during its downward movement. Upon completion of the expanding and lateral flattening operation, the upper part of press 21 is moved upwardly and the formed rim blank 13 is removed. Further, it is to be noted that punch 25 is upwardly and downwardly adjustable in retainer 33 as by threads 42, to vary expansion of the rim blank, to hold size within precise tolerances as required.

Shown in FIGS. 6 and 7 of the drawings is a press apparatus, generally indicated by the numeral 51, which is suitable for effecting the precision-finishing operation described with reference to view *g* of FIG. 1. Press 51 includes a base 52 having a central opening 53 therein for receiving suitable pressure actuating means such as an air or hydraulic cylinder 54. Connected to the operating rod 55 of cylinder 54 is an axially movable platform 56 having a resiliently mounted locator plate 68 to support and locate a preformed wheel rim blank 13 in a work position.

A plurality of radially movable die members 57 is normally positioned spaced radially outwardly from the platform 56, as shown in FIG. 6. Each die member 57 comprises a segment of a circle so that, collectively, the die members enclose the rim blank 13 when moved to the work position shown in FIG. 7. Suitable fluid-pressure actuating means such as hydraulic cylinders 58 mounted on base 52 are adapted to move die members 57 radially inwardly and outwardly.

Each of the die members 57 is comprised of an outer portion 59 and a removable inner portion 60. The inner portion 60 is provided on its inside face with a contour corresponding to the desired finished exterior contour of the rim blank 13 being worked upon. The inner portions 60 of the die members 57 may be readily removed and replaced to accommodate rim blanks of different contours and diametric sizes. The external face of outer portion 59 of each die member 57 is inclined inwardly from the base 52.

The press apparatus 51 is provided with a vertically movable upper die plate 62 positioned above the lower die members 57. Any suitable means such as a fluid-pressure operated actuating device may be employed to move plate 62 vertically upwardly and downwardly. Secured to the center of upper die plate 62 above rim blank 13 and platform 56 is a male forming die or punch 63 having an outer contour corresponding to the desired inner contour of the rim blank to be finished. Die 63 may be removed and replaced to accommodate the making of rim blanks of different contours.

A die locking ring 64 is normally positioned above lower die members 57 and platform 56. Ring 64 is provided adjacent its outer edges with a plurality of support rods 65 which extend through, and are slidably received within, openings in plate 62 so that the ring 64 is free for vertical movement relative to plate 62. Ring 64 may be moved vertically upwardly or downwardly by suitable means such as a fluid pressure operated actuating device.

The inside face 66 of ring 64 is tapered or inclined outwardly from the die plate 62 for wedging cooperation with the inclined outside faces of portions 59 of die members 57. A bearing ring 67 is mounted on the inside face 66 of ring 64 to contact the outside of die members 57.

In operation, press apparatus 51 and the platform 56 carrying locator 68 are initially raised to an upper position, as shown in FIG. 6, to support and locate a rim blank 13, already preformed in the press of FIGS. 2 through 5. The platform 56 is then lowered by cylinder 54 to a work position to dispose the blank 13 within the die members 57. Die members 57 are now moved inwardly by cylinders 58 to the radially inward position shown in FIG. 7, to contact and completely enclose the rim blank 13. Upper plate 62 carrying male die member 63, and ring 64 are then moved downwardly. It is to be noted that the inside face of bearing ring 67 on ring 64 contacts the outside faces of portions 59 of die members 57 wedgingly and locks them against radial outward movement before the male die punch 63 is actively received within the rim blank 13.

The male die member 63 continues its downward movement until it is in pressure contact with the interior of rim blank 13, as shown in FIG. 7. As the lower portion of the male die member 63 continues downward it contacts locator 68 and depresses it against springs into a recess in platform 56, until male die member 63 reaches bottom of its downward intermediate stroke.

Further plate 62 (and punch 63) continue downward to lower die member 57 and to press holding plate 69 downward against a plurality of pins 70 which in turn engage a lower cushion plate 71 supported on a resistance means such as hydraulic cylinder 72. When gap 73 between holding plate 69 and the spacer blocks on base 52 has been closed, and with continued downward pressure of plate 62, punch 63, ring 64, and die members 57, the lower edge of rim blank 13 is flattened laterally against top of platform stage 56 in proportion to pressure applied on punch 63.

When male die member 63 has been fully received within rim blank 13 and continued pressure is maintained, it is to be noted that pressure is simultaneously applied both radially inwardly and outwardly as well as axially to all parts of the rim blank 13 as illustrated by the arrows in view g of FIG. 1. The exertion of this high pressure on all parts of the rim blank 13 acts to precision-finish the rim blank 13 to predetermined dimensions, contour and thickness characteristics.

Figure 8:
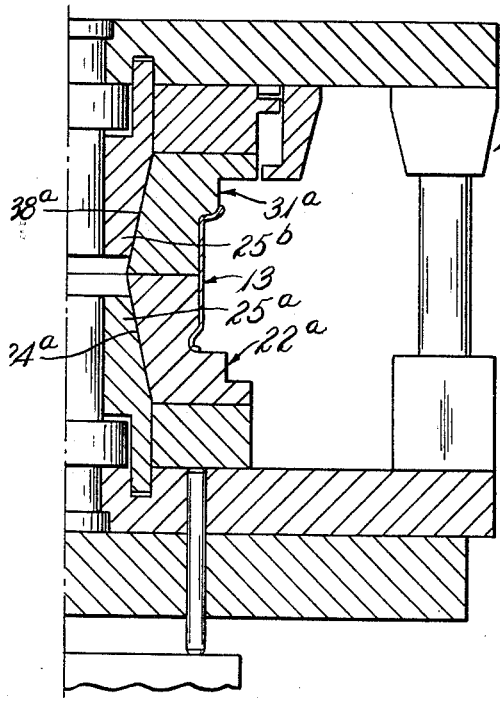
FIG. 8 is a view similar to FIG. 3 showing a modification thereof.

FIG. 8 shows a modified press 21a similar to press 21 of FIGS. 2 and 3 in which the lower and upper dies 22a and 31a, respectively, are provided with reversely tapered openings 24a and 38a, respectively. Cooperating with the openings 24a and 38a to provide radial expansion to the dies 22a and 31a, coaxially aligned reversely tapered punches 25a and 25b respectively, are provided. Each punch 25a and 25b is axially adjustable to vary the expansion of the bottom and top dies 22a and 31a respectively to form the rim to precision tolerances.

Figure 9:
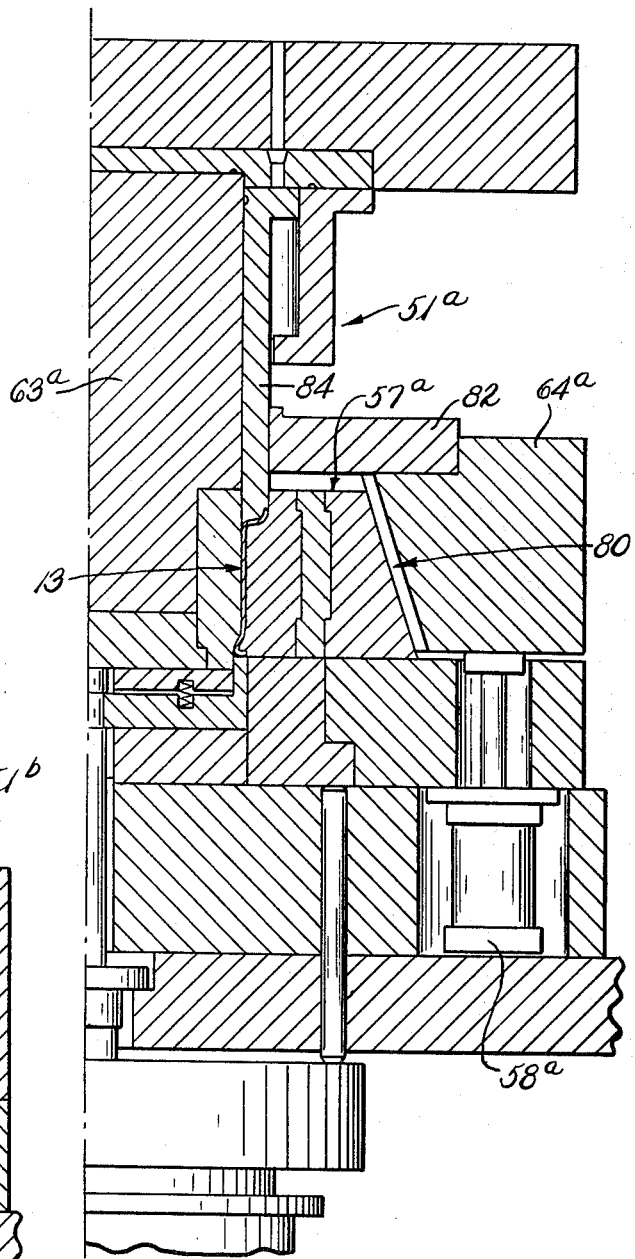
FIG. 9 is a view similar to FIG. 7 showing a modification thereof.

FIG. 9 illustrates a modified press 51a similar to press 51 for precision-finishing the rim 13. A die locking ring 64a is positioned on the lower portion of the press 51a and remains in engagement with the outer periphery of the lower die members 57a. The die members 57a are expanded and contracted by cylinders 58a which raise or lower the locking ring 64a to provide the necessary cam action of the inclined mating surfaces indicated at 80. A nesting plate 82 is provided on the top of ring 64a to accurately center and guide the punch 63a during the working stroke. A stripper ring portion 84 is provided to remove the rim 13 from the punch 63a should the rim cling thereto.

Figure 10:
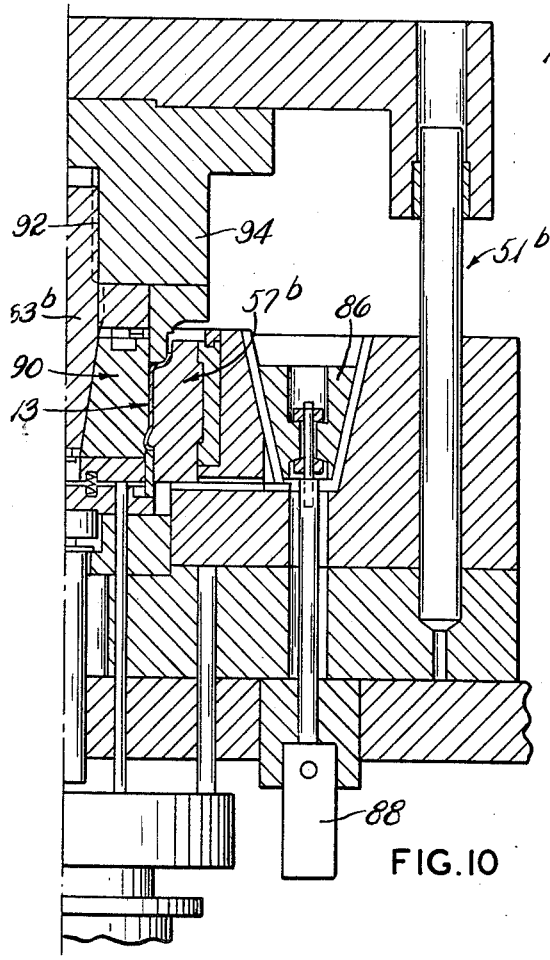
FIG. 10 is a view similar to FIGS. 7 and 9 showing yet another modification thereof.

FIG. 10 shows yet a further modified press 51b similar to presses 51 and 51a for precision-finishing the rim 13. In this instance tapered wedge plates 86 are provided to impart radial movement to the lower die members 57b. Cylinders 88 connected to plates 86 move the plates up or down thus moving the die members 57b horizontally. The upper die members 90 are expanded or contracted by a tapered punch 63b adjustably retained as by threads 92 in the punch holder 94.

It is thus apparent that the press apparatus 51 and 51a provide means for precision-finishing a previously substantially finished rim blank in a single cold forming die pressing operation. The rim products produced by this apparatus have a more consistent contour, thickness and concentricity than those heretofore obtainable through the use of presently known apparatus. Moreover, the apparatus accomplishes in a single operation what formerly required several operations.

Although the present invention has been illustrated and described with reference to a specific method and apparatus, it will be understood that various modifications may be made by persons skilled in the art without departing from the spirit of the invention which is defined solely by the appended claims.

What is claimed is:

1. Apparatus for manufacturing a wheel rim comprising
    means for supporting a wheel rim blank in a work position,
    a plurality of radially movable die members positioned radially outside said work position,
    means for moving said die members radially inwardly into working contact with the blank in said work position,
    a die locking ring and a punch normally positioned above said work position,
    and means for moving said ring and punch downwardly into said work position in coordination with the radially inward movement of said die members, said ring encircling and locking said die members in contact with the outside of the blank and said punch contacting the blank to apply axial and radial pressure to all parts of said blank, whereby to cold form said blank to precision finished predetermined dimensions in a single operation.

2. Apparatus as defined in claim 1 wherein said blank supporting means comprises a platform axially movable into and out of said work position.

3. Apparatus as defined in claim 1 wherein each of said die members has a removable radial inner contour portion permitting interchange to accommodate the production of different wheel rim blanks.

4. Apparatus for manufacturing a wheel rim comprising
    a platform for supporting a wheel rim blank in a work position, said platform being movable axially into and out of said position,
    a plurality of cooperating, radially movable die members normally positioned radially outside said work position, each of said die members having a removable radial inner contour portion permitting this interchange to accommodate the production of different wheel rim blanks,
    means for moving said die members radially inwardly into working contact with the blank in said work position,
    a die locking ring and a punch normally positioned above said work position, said ring normally being positioned below said punch,
    and means for sequentially moving said ring downwardly into locking contact with the outside of said die members after their radial inward movement encircling the blank, and moving said punch into contact with the interior and edge surfaces of the blank to apply axial and radial pressure to all parts of said blank to cold form said blank to precision-finished predetermined dimensions in a single operation.

5. An apparatus as defined in claim 4 wherein the inner face of said die locking ring tapers upwardly and has a bearing ring thereon for contact with upwardly tapering outer faces on said die members.

6. An apparatus as defined in claim 4 wherein said die moving means comprises fluid pressure operated actuating means.

7. An apparatus as defined in claim 4 wherein the outer faces of said die members are included outwardly from top to bottom and the inner face of said die locking ring is inclined inwardly from bottom to top whereby said ring functions to wedge said die members radially inwardly as said ring contacts said members.

References Cited

UNITED STATES PATENTS

| | | | |
|---|---|---|---|
| 2,227,524 | 1/1941 | Williams | 72—355 |
| 2,292,054 | 8/1942 | Cleveland | 72—355 |
| 2,748,464 | 6/1956 | Kaul | 72—356 |
| 2,828,538 | 4/1958 | Darden | 72—355 |
| 2,843,173 | 7/1958 | Voss | 72—353 |
| 3,298,218 | 1/1967 | Gollwitzer | 72—355 |

MILTON S. MEHR, Primary Examiner

U.S. Cl. X.R.

72—399

PO-1050
(5/69)

UNITED STATES PATENT OFFICE
CERTIFICATE OF CORRECTION

Patent No. 3,509,755      Dated May 5, 1970

Inventor(s) Walter William Bulgrin

It is certified that error appears in the above-identified patent and that said Letters Patent are hereby corrected as shown below:

In the Specification:

Column 2, line 53, change "meal" to --metal--.

Column 7, line 38, change "stage" to --stake--.

In the Claims:

Column 9, line 9, change "included" to --inclined--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents